Sept. 22, 1925.                                               1,554,217
G. W. KESSLER
DIRIGIBLE HEADLIGHT FOR AUTOMOBILES
Filed Nov. 5, 1923                2 Sheets-Sheet 1
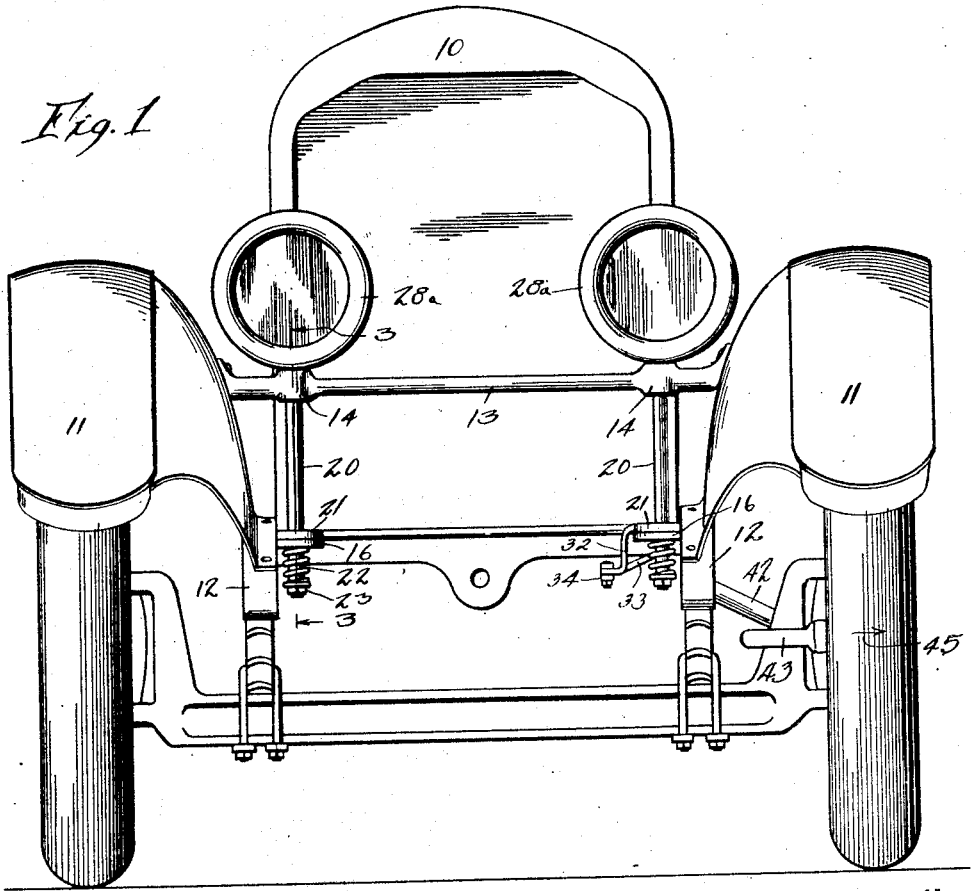
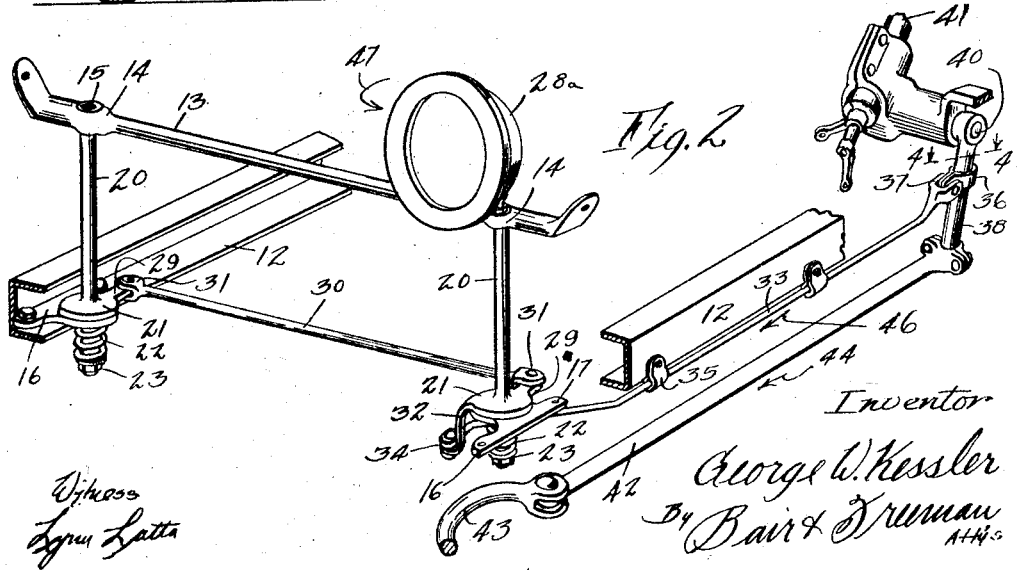

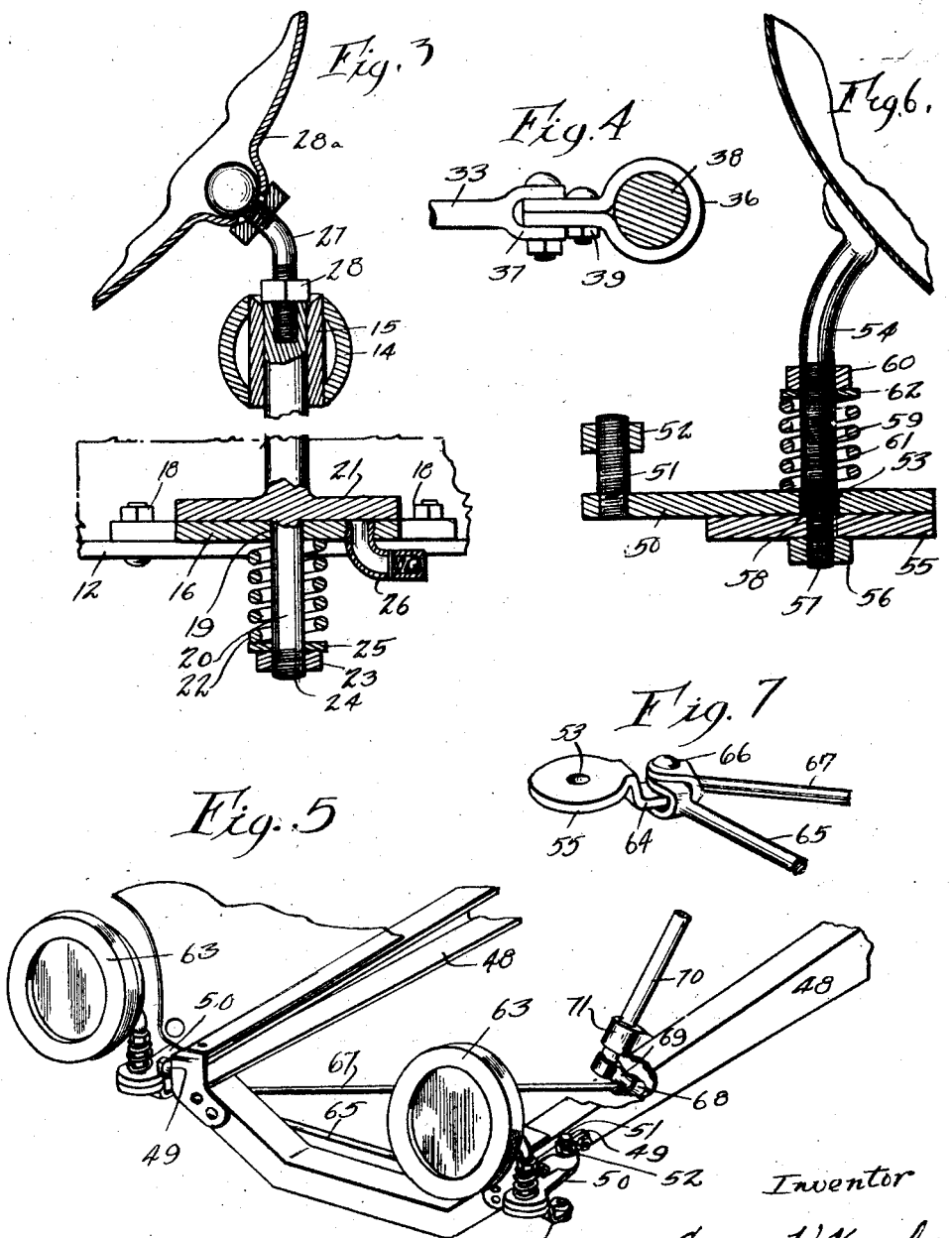

Patented Sept. 22, 1925.

1,554,217

UNITED STATES PATENT OFFICE.

GEORGE W. KESSLER, OF ROCK VALLEY, IOWA.

DIRIGIBLE HEADLIGHT FOR AUTOMOBILES.

Application filed November 5, 1923. Serial No. 672,762.

*To all whom it may concern:*

Be it known that I, GEORGE W. KESSLER, a citizen of the United States, residing at Rock Valley, in the county of Sioux and State of Iowa, have invented a certain new and useful Dirigible Headlight for Automobiles, of which the following is a specification.

The object of my invention is to provide dirigible head lights for automobiles or the like wherein the head lights may be moved from one side to another side when the steering shaft of the automobile is operated, the parts being of simple, durable, and comparatively inexpensive construction.

More particularly, my invention relates to a dirigible head light in which a pair of plates are mounted on a pair of brackets and yieldingly held together so that the head lights will be retained under tension against undesired movement when riding over rough roads.

Still a further object is to operate the dirigible head lights from the steering arm of the mechanism of the automobile so that the connection between the dirigible head lights and the steering mechanism is as direct as possible for avoiding looseness of the parts, which is undesirable because it permits the headlights to swing when undesired.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a front elevation of an automobile with my improved dirigible head lights installed thereon.

Figure 2 is a perspective view showing the dirigible head lights, with parts omitted in order to more clearly illustrate the construction and arrangement of my head lights.

Figure 3 is a vertical sectional view taken on line 3—3 of Figure 1.

Figure 4 is a detail sectional view taken on line 4—4 of Figure 2.

Figure 5 is a perspective view of a portion of the chassis of an automobile with a slightly modified form of head lights shown thereon.

Figure 6 is a detail, vertical sectional view through the supporting bracket and plate of the form of invention shown in Figure 5; and Figure 7 is a detail, perspective view showing the tie rod and control rod connected to one of the plates forming a part of my construction.

In the accompanying drawings I have used the reference numeral 10 to indicate generally an automobile which is provided with fenders 11. The automobile body is mounted upon the chassis 12 which is ordinarily channel shaped in cross section.

In the particular type of my invention shown in Figure 1 of the drawings, the fenders 11 are connected together by a cross brace 13. The cross brace 13 is spaced a substantial distance above the chassis 12.

A pair of bearings 14 are formed in the cross brace 13 and have mounted therein bushings 15.

Secured to the chassis 12 on each side thereof are the brackets 16. The brackets 16 are provided with openings 17 through which the bolts 18 may be extended for securing them to the chassis 12.

Portions of the brackets 16 extend inwardly from the chassis 12 and toward each other.

The brackets 16 are provided with openings 19 through which are extended the light stems 20. The light stems 20 extend up above the brackets 16 and through the bushings 15, as clearly shown in Figure 3 of the drawings.

The light stems 20 have plates 21 formed thereon which rest upon the brackets 16.

The plates 21 may be suitably fastened to the light stems 20 or may be formed integral therewith.

The lower ends of the light stems 20 below the plates 21 have coiled springs 22 mounted therearound.

Nuts 23 on the screw threaded ends 24 retain the springs 22 in position on the stems 20. The springs 22 have one of their ends resting against the underside of the plate 16 and the other ends upon washers 25 resting against the nuts 23.

From the construction of the parts just described, it will be seen that the springs 22 tend to hold the plates 21 in engagement with the brackets 16.

Oiling devices 26 are mounted in the brackets 16 for permitting the brackets 16 and the plates 21 to be lubricated.

The upper end of each of the light stems 20 has fixed to it a coupling 27. The coupling 27 is connected to the lights 28ª by the ordinary ball and socket joint construction.

The couplings 27 are screw threaded into the stems 20 and the nut 28 is used for locking the coupling 27 relative to the stem 20.

The plates 21 are each provided with lugs 29 which are connected together by a tie rod 30. The ends of the tie rod 30 are provided with clevises 31 which receive the lugs 29.

From the construction of the parts just described it will be seen that rotation of either of the light stems 20 will cause the other one to move in unison therewith.

One of the plates 21 has formed on it a downwardly extending lug 32 to which is fixed a control rod 33 by means of a clevis joint 34.

The control rod 33 extends along one side of the chassis 12 and is supported by means of a pair of guide loops 35.

The rear end of the control rod 33 is connected to the friction band 36 by means of a clevis joint 37 as clearly shown in Figure 4 of the drawings.

The friction band 36 is mounted on the steering arm 38 and is frictionally held thereon by means of the bolt 39. The clevis joint 37 connects the friction band 36 to the control rod 33.

The steering arm 38 is connected by means of a short shaft 40 to the steering shaft 41. The lower end of the steering arm 38 has a steering arm 42 connected thereto which controls the front wheels of the automobile.

The steering rod 42 is connected to one of the wheels of the automobile by the connection 43.

From the construction of the parts just described it will be seen that when the steering rod 42 is moved forwardly in the direction indicated by the arrow 44, it will cause the front wheels to move in a direction indicated by the arrow 45, which in turn will cause the control rod 33 to be slid forwardly in the direction indicated by the arrow 46, which will rotate the head lights 28ª on a vertical axis indicated by the arrow 47.

In this connection it may be mentioned that the control rod 33 is connected directly to the steering arm 38 rather than to the steering rod 42 or to the connection 43 and by so doing, I eliminate any of the loose or pivotal connection between the parts which ordinarily would cause the head lights to rotate somewhat. The connecting of the control rod 33 as directly as possible with the steering shaft is very desirable.

In Figures 5, 6 and 7, I have shown a slightly modified form in which the chassis 48 is of the Ford type.

It may be mentioned that light brackets 49 are ordinarily mounted on the chassis 48.

I provide a bracket 50 at one end of which is a bolt 51 for connecting it to the bracket 49 and held thereon by means of the nut 52. The bracket 50 is formed with an opening 53 in which a light stem 54 is received.

The light stem 54 has a plate 55 secured near its lower end and held thereon by a nut 56 coacting with the screw threads 57. The light stem 54 is provided with a screw threaded portion 59 having the nut 60 thereon.

The coil spring 61 is received on the stem 54 and extends between the upper surface of the bracket 50 and a washer 62 resting against the nut 60.

From the construction of the parts just described, it will be seen that the light stem 54 is held under tension so that the underside of the bracket 50 and the upper side of the plate 55 are frictionally held in engagement.

Secured to the upper ends of the stems 54 are the ordinary head lights 63.

The plates 55 each have lugs 64 which are connected together by a tie rod 65. The lugs 64 are connected to the tie rod 65 by means of a clevis joint.

Secured to one of the lugs 64 by means of a clevis joint 66 is the control rod 67. The control rod 67 has its free end secured to a friction band 68 mounted on the steering arm 69 of the steering shaft 70.

The steering shaft 70 is mounted in an ordinary bracket 71 secured to the chassis 48. The steering mechanism just described is of the ordinary Ford construction.

From the construction of the parts just described it will be seen that rotation of the steering shaft 70 will cause the control rod 67 to move, which in turn will cause the lights 63 to rotate.

The springs 61 hold the head light 63 against any undesired vibration or movement.

It may be mentioned that where clevis connections have been shown, ball and socket joints may be used equally as well.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. In combination with an automobile, dirigible headlights comprising brackets secured at one end to the frame of the automobile, enlarged bearing portions at the other end, rotatable plates on said enlarged portions, stems secured to said plates and extending through said enlarged bearing portions, yielding means for holding the plates in frictional engagement with the bearing portions, the upper portion of said stems rotatably mounted in a cross brace secured to the fenders of said automobile, and lights secured to the ends thereof, a tie rod connecting said plates together for causing them to rotate in unison, and a rod pivotally connected at one end to one of said plates and at its other end to the steering mechanism of the automobile.

2. In combination with an automobile, dirigible headlights comprising brackets secured at one end to the frame of the automobile, enlarged bearing portions at the other end, rotatable plates on said enlarged portions, perforated extensions on said plates, stems secured to said plates and extending through said enlarged bearing portions, yielding means for holding the plates in frictional engagement with the bearing portions, the upper portion of said stems rotatably mounted in a cross brace secured to the fenders of said automobile, and lights secured to the ends thereof, a tie rod for connecting the perforated extension of one plate to the perforated extension of the other plate, and a rod pivotally connected at one end to the perforated extension of one of said plates and at its other end to the steering mechanism of the automobile.

GEORGE W. KESSLER.